United States Patent Office 3,483,176
Patented Dec. 9, 1969

3,483,176
PRODUCTION OF ISOBUTYLENE-DIENE COPOLYMERS USING ZIRCONIUM HALIDE-CONTAINING CATALYSTS
Mitsuji Miyoshi, Kawasaki, Kanagawa, Hirosuke Imai, Yokohama, Kanagawa, Yutaka Otsuki, Tokyo, and Hajime Hara, Fujisawa, Kanagawa, Japan, assignors to Nippon Oil Company, Limited, Minato-ku, Tokyo, Japan
No Drawing. Filed Jan. 31, 1967, Ser. No. 612,806
Claims priority, application Japan, Feb. 10, 1966, 41/7,431
Int. Cl. C08f 29/08, 1/28; C08d 3/04
U.S. Cl. 260—85.3                                     7 Claims

ABSTRACT OF THE DISCLOSURE

A process for producing olefin copolymers in which isobutylene units and conjugated diene units are statistically distributed which comprises copolymerizing isobutylene with conjugated diene in the presence of a catalyst obtained by reacting (1) mercuric halide, aluminium ha ide or hydrogen halide, (2) zicronium halide and (3) metallic aluminium in an aromatic compound such as benzene, alkylbenzene, and halides thereof.

---

This invention re'ates to a process for producing olefin copolymers, and more particularly, to a process for producing copolymers of isobutylene and conjugated dienes.

It is well know that isobutylene may be copolymerized with conjugated dienes such as 1,3-butadiene, isoprene, pipery'ene, 1,3-cyclohexadiene or the like in the presence of Friedel-Crafts type catalysts such as aluminium ch'oride and boron trifluoride at a low temperature, e.g. —100° C. For instance, the production of butyl rubber is a typical example of such processes mentioned above.

However, it is also we'l known that in the copolymerization of isobutylene and conjugated dienes using Friedel-Crafts type catalysts, conjugated dienes are not only incorporated into the copolymeric chain with great difficulty but also the content of these conjugated diene units contained in the copolymers is usual y very low.

Although in recent years many attempts have been devoted to copolymerize isobutylene with conjugated dienes at a temperature of room temperature or its vicinity by using Ziegler-Natta catalyst, there has been practically no report that a copolymer in which iscbutylene units and con'ugated diene units are statistica'ly distributed as a result of such attempts.

We have conducted a thorough s'udy of the copolymerization process to obtain a copolymer in which isobuty'ene units and conjugated diene units are statistically distributed. As a result, we have found that a true copolymer having statistical distribution of isobutylene units and conjugated diene uni:s therein may be obtained by copolymerizing isobutylene with conjugated diene in the presence of a novel catalyst obtained by reacting (1) a member selected from the group consisting of mercuric halide, aluminium halide and hydrogen halide, (2) zirconium halide and (3) meta'lic aluminium in an aromatic compound selected from the group consisting of benzene, alkylbenzene and halides thereof.

The process of this invention has not only an outstanding feature in that the content of isobutylene units contained in the product copolymer may be optionally varied, if desired, by adjusting the proportion of the monomer charged over a wide range, but also an advan'age in that a novel copolymer having excellent physical and chemical properties, which render it suitable for wide-spread applications such as for high molecular weight products, may be obtained from isobutylene and conjugated dienes.

Catalyst which may be used in the process of this invention may be prepared by the in:erreaction of zirconium halide, metallic a'uminium and aluminium halide in a medium such as aromatic hydrocarbon or halides thereof. Alternatively, is may also be prepared by the interreaction of ziconium halide, metallic aluminium and hydrogen ha!ide or mercuric halide.

Zirconium halides which may be used in the process of this invention include, for example, zirconium tetrachloride, zirconium tetrabromide and zirconium tetraiodide.

Aluminium ha'ides which may be used in the process of this invention include, for example, aluminium trichloride, aluminium tribromide and a'uminium triiodide.

Hydrogen halides which may be used in the process of this invention include hydrogen chloride and hydrogen bromide. Mercuric halides which may be used in the process of this invention preferably include mercuric ch'oride and mercuric bromide.

Aromatic hydrocarbons and halides thereof which may be used in the preparation of the cata'yst of this invention preferably include, for example, benzene, alkylbenzenes such as toluene, xylene, ethylbenzene, cumene and the like, and halogen substituted aromatic hydrocarbons such as chlorobenzene, bromobenzene, iodobenzene, o-, m- and p-chlorotoluene, and the like.

In preparing the catalyst of this invention, a mixture consisting of aromatic hydrocarbons or ha'ides thereof, zirconium halide, metallic aluminium and aluminium halide mentioned above is reac'ed in an atmosphere of an inert gas such as nitrogen or argon at a temperature of preferably from 50° C. to 150° C. for half an hour to 24 hours, or, a mixture consisting of these aromatic hydrocarbons or halides thereof, zirconium halide, metal'ic aluminium and mercuric halide is reacted at a temperature of preferably from 50° C. to 150° C. for an hour to 10 hours to give the cata'yst of this invention.

Alternatively, the catalyst of this invention may be easily prepared by heating a mixture of these aromatic compounds, zirconium halide and metallic aluminium at a temperature of preferably from 50° to 150° C. and blowing dried hydrogen chloride thereinto for, half an hour to 10 hours.

The catalytic ingredients used in the preparation of catalysts of this invention may be reacted in a ratio of, for example, 0.5 to 5 mols of aluminium halide, 0.5 to 10 gram atoms of metallic aluminium, 0.5 to 5 mols of mercuric halide, and 0.5 to 10 mols of hydrogen chloride per mol of zirconium halide, respectively. Aromatic hydrocarbons or halides thereof in an amount of more than 10 mols per mol of zirconium halide may be preferably used.

The catalyst of this invention is an oily material having dark-purplish color which is difficultly soluble in benzene and alkylbenzene and easily soluble in halogen-substituted aromatic hydrocarbons. Thus, when the catalyst of this invention is prepared in benzene or alkylbenzene, it is separated therefrom as an oily material. The layer of oily matter thus separated may be used as a catalyst in the reaction as it is, or it may be used in the form of solution obtained by dissolving the same in halogen substituted hydrocarbons.

If the catalyst of this invention is prepared in halogen substituted hydrocarbons, the resulting mixture may be readily used in the copolymerization reaction of this invention as it is, since the resulting catalyst may be dissolved therein.

Monomeric conjugated dienes which may be copolymerized with isobutylene according to the process of this invention include, for example, 1,3-butadiene, isoprene, piperylene, 1,3-cyclohexadiene and the like.

The copolymerization reaction using the catalyst of this invention is conducted in a reactor which has been sufficiently dried, under a stream of an inert gas such as dried nitrogen or argon either batchwise or continuously.

In practising the copolymerization according to the process of this invention, an amount of catalyst corresponding to $1 \times 10^{-4}$ to $1 \times 10^{-1}$ gram atom of zirconium per mol of the total monomers may be preferably used.

The copolymerization temperature in the process of this invention is preferably from $-78°$ to $100°$ C., and the copolymerization reaction may be carried out under a reaction pressure of from 1 to 10 atmospheres.

Any organic solvent may be conveniently used in the copolymerization according to the process of this invention so long as it causes no adverse effect on the polymerization reaction. Thus, aromatic compounds used in the preparation of the catalyst, for example, benzene, alkylbenzene or halides thereof, and aliphatic hydrocarbons or halides thereof may be conveniently used.

In accordance with this invention, there is provided copolymers of isobutylene and conjugated diene in which isobutylene units and conjugated diene units are statistically distributed and the double bonds are mainly disposed in trans-position.

The physical properties of the copolymers of isobutylene and conjugated diene of this invention vary depending upon the content of isobutylene unit therein. More practically, when the content of isobutylene recurring units is high, the product copolymer is a rubber-like or viscous semi-solid, and if butadiene unit is high, then resinous copolymer may be produced.

Thus, either synthetic rubbers or resins may be produced depending upon the objective by simply adjusting the proportion of the monomers charged. It is readily appreciated that this indicates great utility of this invention from the industrial standpoint.

The following examples will serve to illustrate this invention. It should not be construed, however, that these examples restrict the process of this invention as they are given merely by way of illustration:

EXAMPLE 1

To a 200 ml. flask provided with a reflux condenser and a stirrer which was sufficiently dried and flushed with nitrogen were added under nitrogen stream 13 g. (46 mmol) of mercuric chloride, 2 g. (74 mmol) of metallic aluminium, 10 g. (46 mmol) of zirconium tetrachloride and 100 ml. of benzene in an orderly manner, and then the resulting mixture was reacted at a reflux temperature of benzene for 3 hours with vigorous stirring. The mixture was colored dark purple soon after the heating. After the completion of the reaction, the reaction mixture was allowed to stand still to give a layer of oily matter beneath a layer of benzene. Said layer of oily matter was taken out under nitrogen stream and washed repeatedly with benzene, then, dissolved in 100 ml. of chlorobenzene to give a catalyst solution.

Next, to a 150 ml. pressure-resistant glass reactor which was dried and flushed with nitrogen were charged each portion of 7 g. of purified isobutylene and 1,3-butadiene, and further 40 ml. of chlorobenzene. To the reactant mixture which was cooled to $-78°$ C. was added the above-mentioned catalyst solution in an amount corresponding to $0.9 \times 10^{-5}$ gram atom of zirconium, and the resulting mixture was copolymerized without stirring while maintaining the temperature at $30°$ C.

After the reaction was carried out for 3.5 hours, the copolymerization mixture was poured into methanol containing 0.2% of phenyl-$\beta$-naphthylamine to precipitate the copolymer. The product copolymer was once dissolved in benzene to remove catalyst residue therefrom and further precipitated in methanol, then, dried under a reduced pressure to afford 12 g. of colorless transparent resinous product. The yield corresponded to a conversion of about 86%.

An analysis of the copolymer by an infrared absorption spectrum revealed that it contained 51% by weight of isobutylene unit and 49% by weight of 1,3-butadiene unit and that the double bonds in the copolymer are disposed mainly in trans-position. The inherent viscosity of the copolymer as measured in toluene solution at $30°$ C. was 0.17.

Notwithstanding the fact that 1,3-butadiene units in the copolymer obtained according to this invention are bonded mainly at trans-1,4 positions thereof, the product was soluble in solvents such as petroleum ether, acetone and the like in which trans-1,4-polybutadiene is usually insoluble. The ozonolysis of the product copolymer produced low molecular compounds having a molecular weight of 420, and it was, therefore, confirmed that the copolymer according to this invention is not a mixture of a homopolymer of isobutylene and a homopolymer of poly-1,3-butadiene.

Moreover, it is clearly indicated that the product copolymer has isobutylene units and 1,3-butadiene units which are statistically distributed therein from the following result of separation by precipitation. In conducting the test, the product copolymer was separated by precipitation in benzene-methanol into four portions, and the inherent viscosities and the contents of isobutylene unit of each respective portion were measured with the results as given in the following table, showing that isobutylene units and 1,3-butadiene units are uniformly distributed in the product copolymer:

| | Percentage by weight of each portion | Inherent viscosity $(\eta)$[1] | Content of isobutylene unit (wt. percent) |
|---|---|---|---|
| Portion Number: | | | |
| 1 | 29 | 0.32 | 48 |
| 2 | 20 | 0.16 | 50 |
| 3 | 28 | 0.11 | 52 |
| 4 | 23 | | 54 |

[1] As measured in toluene solution at 30° C.

EXAMPLES 2–5

Example 1 was repeated according to the same procedure as described therein except that the proportions of isobutylene to 1,3-butadiene charged were varied as specified in the following table with the results shown therein:

| Example | Ratio of monomeric isobutylene to 1,3-butadiene charged[1] | Yield of polymer (percent) | Inherent viscosity $(\eta)$[2] | Content of isobutylene unit (wt. percent) |
|---|---|---|---|---|
| 2 | 9:1 | 69 | 0.17 | 83 |
| 3 | 3:1 | 67 | 0.14 | 71 |
| 4 | 1:1 | 74 | 0.19 | 51 |
| 5 | 1:3 | 71 | 0.24 | 31 |

[1] Total weight of monomers was 14 g.
[2] As measured in toluene solution at 30° C.

The product copolymers obtained in Examples 2 and 3 were soft wax-like materials and those obtained in Examples 4 and 5 were transparent resins. The double bonds in these copolymers obtained in Examples 2–5 were mainly disposed in trans-position.

EXAMPLE 6

To a 200 ml. flask provided with a reflux condenser and a stirrer which was dried and flushed with nitrogen were added 100 ml. of benzene, 2 g. (74 mmol) of metallic aluminum powder and 10 g. (46 mmol) of zirconium tetrachloride. The reactant mixture was heated at 78° C. while blowing dried hydrogen chloride thereinto. The reaction was carried out for 5 hours under such conditions that the reactant mixture was saturated with gaseous hydrogen chloride and benzene was slowly refluxed, and the reaction product was colored dark purple. After the completion of the reaction, the stirring was terminated, and a layer of dark purplish oily matter was separated beneath a layer of benzene. Said oily matter was taken out and gaseous nitrogen was blown thereinto to expel the excess hydrogen chloride, then, 100 ml. of chlorobenzene was added thereto to give a catalyst solution.

Next, to a 150 ml. pressure resistant glass reactor which was dried and flushed with nitrogen were charged each portion of 7 g. of purified isobutylene and isoprene, and 140 ml. of methylene chloride and the above-mentioned catalyst dissolved in chlorobenzene in an amount corresponding to $1.2 \times 10^{-3}$ gram atom of zirconium were further added thereto while maintaining the temperature of the reactants at −78° C., and the copolymerization was carried out for 3.5 hours thereafter at 40° C.

After the completion of the reaction, the copolymerization mixture was poured into methanol containing 0.2% of phenyl-$\beta$-naphthylamine to precipitate a copolymer. The product copolymer was once dissolved in benzene and reprecipitated in methanol and dried in vacuo to afford 11.5 g. of soft resinous product.

An analysis by an infrared absorption spectrum revealed that the resinous product contained 48% by weight of isobutylene unit and that the double bonds in the product copolymer were disposed mainly in trans-position.

EXAMPLE 7

To a 200 ml. flask provided with a reflux condenser and a stirrer which was dried and flushed with nitrogen were charged 12.4 g. (46 mmol) of dried aluminium tribromide, 2 g. (74 mmol) of metallic aluminium powder, 20.6 g. (50 mmol) of zirconium tetrabromide, and 100 ml. of benzene, and the resulting reactant mixture was reacted for 5 hours by heating them with stirring.

When the reaction was completed, a layer of dark purplish oily matter was separated beneath a layer of benzene. Said layer of oily matter was taken out under nitrogen stream and washed repeatedly with benzene, then, 100 ml. of chlorobenzene was added thereto to give a catalyst solution.

Next, to a 150 ml. pressure-resistant glass reactor which was dried and flushed with nitrogen were charged each portion of 7 g. of isobutylene and 1,3-cyclohexadiene, and, while maintaining the temperature of these reactants at −78° C., 40 ml. of chlorobenzene and the above-mentioned catalyst dissolved in chlorobenzene in an amount corresponding to $2.0 \times 10^{-3}$ gram atom of zirconium were further added thereto, and the resulting mixture was copolymerized at 50° C. for 24 hours without stirring.

After the completion of the copolymerization, the copolymerization mixture was poured into methanol containing 0.2% of phenyl-$\beta$-naphthylamine to precipitate a copolymer. The product copolymer was once dissolved in benzene and reprecipitated in methanol and dried in vacuo to afford 9.4 g. of white resinous product.

An analysis by an infrared absorption spectrum revealed that the product copolymer contained 59% by weight of isobutylene unit and that the double bonds in the product copolymer were disposed mainly in cis-position.

EXAMPLE 8

To a 200 ml. flask provided with a reflux condenser and a stirrer which was dried and flushed with nitrogen were charged 100 ml. of chlorobenzene, 13 g. (46 mmol) of mercuric chloride, 2 g. (74 mmol) of metallic aluminium and 10 g. (46 mmol) of zirconium tetrachloride in an orderly manner. Then the reaction was effected at 100° C. for 3 hours with vigorous stirring. After the completion of the reaction, the reaction mixture was allowed to stand still to give a supernatant, which was used as a catalyst solution hereinafter.

Next, to a 150 ml. pressure-resistant glass reactor which was dried and flushed with nitrogen were charged each portion of 7 g. of purified isobutylene and 1,3-butadiene, and 40 ml. of chlorobenzene. To the resulting mixture which was cooled to −78° C. was added 3 ml. of the above-mentioned catalyst solution and the copolymerization was carried out at 30° C. for 3 hours without stirring.

After the completion of the copolymerization, the copolymerization mixture was poured into methanol, containing 0.2% of phenyl-$\beta$-naphthylamine to precipitate a copolymer.

The product copolymer was once dissolved in benzene to remove catalyst residue therefrom and reprecipitated in methanol and dried under a reduced pressure to afford 13.4 g. of colorless transparent resinous product.

An analysis by an infrared absorption spectrum of the product copolymer revealed that it contained 50% by weight of isobutylene unit and that the double bonds therein were disposed mainly in trans-position.

What we claim is:

1. Process for producing olefin copolymers of isobutylene and conjugated diene in which the polymerized conjugated diene is in a predominately trans configuration, which comprises copolymerizing isobutylene with conjugated diene in the presence of a novel catalyst obtained by reacting (1) a member selected from the group consisting of mercuric halide, aluminium halide and hydrogen halide, (2) zirconium halide and (3) metallic aluminium in an aromatic compound selected from the group consisting of benzene, alkylbenzene, and halides thereof.

2. Process according to claim 1 wherein said conjugated diene is selected from the group consisting of 1,3-butadiene, isoprene, piperylene and 1,3-cyclohexadiene.

3. Process according to claim 1 wherein said catalyst is prepared by reacting zirconium halide, metallic aluminium and aluminium halide in a medium selected from the group consisting of aromatic hydrocarbons and halides thereof in an atmosphere of an inert gas at a temperature of from 50° C. to 150° C. for half an hour to 24 hours.

4. Process according to claim 1 wherein said catalyst is prepared by reacting zirconium halide, metallic aluminium and mercuric halide in a medium selected from the group consisting of aromatic hydrocarbons and halides thereof in an atmosphere of an inert gas at a temperature of from 50° C. to 150° C. for half an hour to 10 hours.

5. Process according to claim 1 wherein said catalyst is prepared by heating a mixture of a member selected from the group consisting of aromatic hydrocarbons and halides thereof, zirconium halide and metallic aluminium at a temperature of 50° C. to 150° C. and blowing dried hydrogen chloride thereinto for half an hour to 10 hours.

6. Process according to claim 1, wherein said mercuric halide is selected from the group consisting of mercuric chloride and mercuric bromide, said aluminium halide is selected from the group consisting of aluminium trichoride, aluminium tribromide and aluminium triiodide, said hydrogen halide is selected from the group consisting of hydrogen chloride and hydrogen bromide, said zirconium halide is selected from the group consisting of zirconium tetrachloride, zirconium tetrabromide and zirconium tetraiodide, and said aromatic compound is selected from the group consisting of benzene, toluene, xylene, ethylbenzene, cumene, chlorobenzene, bromobenzene iodobenzene, o-, m- and p-chlorotoluene.

7. Process according to claim 1 wherein said copolymerization is carried out in the presence of said catalyst in an amount corresponding to $1 \times 10^{-4}$ to $1 \times 10^{-1}$ gram atom of zirconium per mol of total monomers in a reaction medium selected from aromatic and aliphatic compounds at a temperature of $-78°$ C. to $100°$ C. and 1 to 10 atmospheres.

References Cited

UNITED STATES PATENTS 3,065,220 11/1962 McManimie et al. ____ 260—94.9
3,230,209 1/1966 Cesare et al. _____ 260—94.3

JOSEPH L. SCHOFER, Primary Examiner

R. A. GAITHER, Assistant Examiner

252—419

U.S. Cl. X.R.